United States Patent

Gawronski et al.

[15] 3,689,831
[45] Sept. 5, 1972

[54] TEST CIRCUIT FOR MEASURING FIGURE OF MERIT OR ATTENUATION RATIO OF VIBRATING SYSTEMS

[72] Inventors: Hfnryk Gawronski, Dobra 17/38; Adam Kunicki, Kordickiego 62/20; Marceli Lewandowski, Al. Waszyngtona 12/14 m.3, all of Warsaw, Poland

[22] Filed: Nov. 30, 1970

[21] Appl. No.: 93,641

[30] Foreign Application Priority Data

Dec. 1, 1969 Poland..........................137239

[52] U.S. Cl. ...............................................324/57 R
[51] Int. Cl. ...............................................G01r 27/00
[58] Field of Search..........................324/102, 57, 77

[56] References Cited

UNITED STATES PATENTS 2,963,647  12/1960  Dean..........................324/77

Primary Examiner—Stanley T. Krawczewicz
Attorney—Waters, Roditi & Schwartz

[57] ABSTRACT

A test circuit for measuring the attenuation ratio of vibrating systems comprises a vibrating system connected to an amplifier in turn connected to a detector responding to average value, and a peak detector connected in parallel to the average detector. The outputs of the two detectors are connected to an adder whose output is applied, through a voltage-to-frequency converter, to a pulse circuit whose outputs are connected to an exciting circuit, to the amplifier and to an integrator.

6 Claims, 2 Drawing Figures

TEST CIRCUIT FOR MEASURING FIGURE OF MERIT OR ATTENUATION RATIO OF VIBRATING SYSTEMS

BRIEF SUMMARY OF THE INVENTION:

The present invention relates to a test circuit for measuring the Q factor or attenuation ratio of vibrating systems.

The known test circuits for measuring the Q factor or attenuation ratio of vibrating systems, are based on either of two principles. One of these employs the measurement of a system frequency response with sinusoidal forcing, the other employs the measurement of the transient with a definite forcing signal, e.g., with a pulse forcing. The first principle is used for resonant circuits of LC type. There are, however, cases of vibrating systems in which the first principle cannot be employed, for example, because an output signal of a low level is substantially disturbed by the constant level of the forcing signal. This is the case when an electrical signal is converted into a non-electrical signal and then re-converted into an electrical signal. In such a case, the dynamic properties of a system are best measured by periodic excitation of the system using a short pulse, and then measuring the generated output waveform. The output waveform is defined by the relation $$u = Ue^{-\alpha t}\sin \omega t \qquad (1)$$

where $\alpha$— is the attenuation ratio (damping factor) of a vibrating system $\omega$— is the natural frequency of the system.

The quantity to be measured is the attenuation ratio and the information about it is comprised in the measured waveform envelope. In the test circuits used up to the present, the result of attenuation ratio measurement has been affected by other parameters of the transient waveform.

It is an object of the present invention to provide a test circuit arrangement for measuring the Q factor or attenuation ratio by making use of the transient measurement principle with a definite forcing signal, which arrangement will give the measurement result independent of the signal amplitude.

This object of the invention is achieved by using a feedback circuit, in which a reference source is employed which has its voltage value made dependent on the initial value U of a transient waveform.

The advantages of such an arrangement consist in the possibility of long-term measurement without need to check the signal level as well as in higher measuring accuracy.

BRIEF DESCRIPTION OF THE DRAWING:

An embodiment of the invention will now be further described by way of example, with reference to the accompanying drawing, wherein.

DETAILED DESCRIPTION

Figure 1:
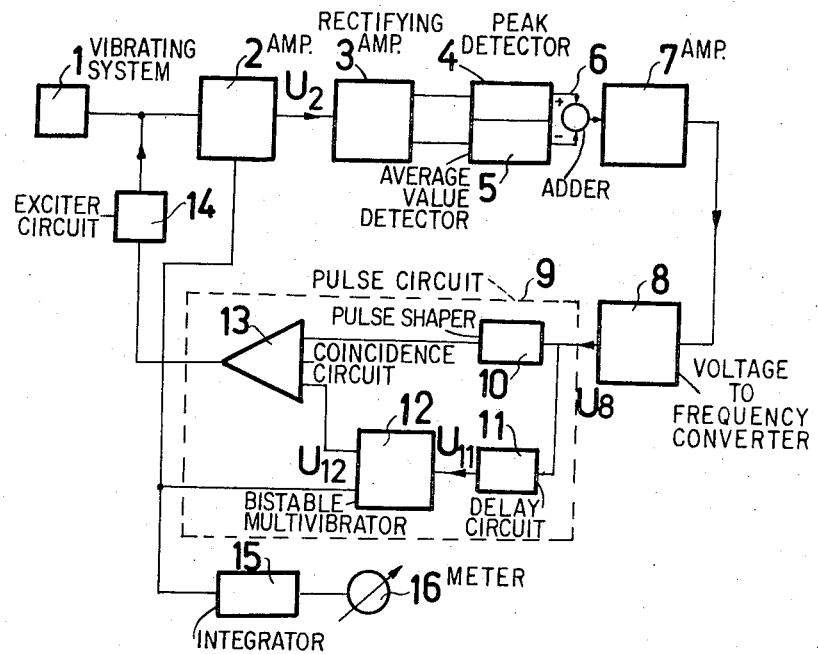
FIG. 1 shows a block diagram of the circuit arrangement according to the invention.

The test circuit arrangement of the invention consists of a vibrating system 1 connected through a keyed amplifier 2 to a rectifying amplifier 3 having two outputs, one of which is connected to a peak detector 4 and the other to another detector 5 responding to average value. The outputs of the detectors 4 and 5 are applied to an adder 6 connected via an amplifier 7 and a voltage-to-frequency converter 8 to a pulse circuit 9. The pulse circuit 9 comprises a pulse-shaping circuit 10, connected to a coincidence circuit 13, and also a delay circuit 11 connected to a bistable multivibrator 12 whose output is applied to the keyed amplifier 2 and an integrator 15.

The circuit operation is described hereafter.

Figure 2:
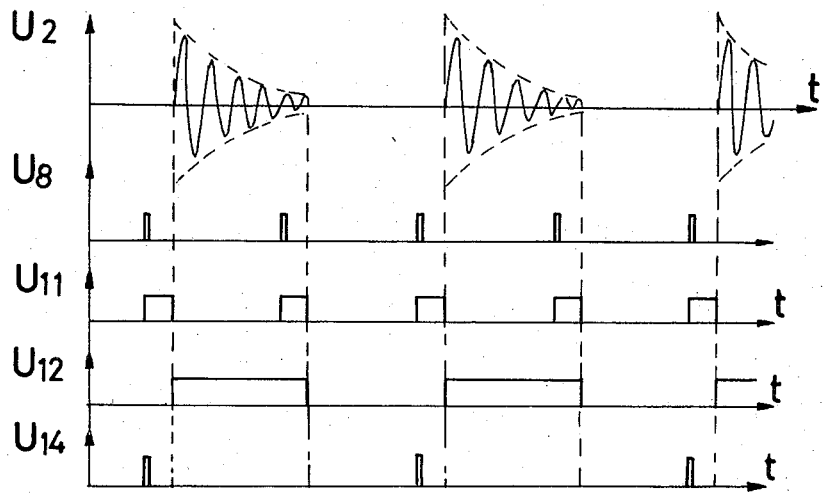
FIG. 2 shows the pulse waveforms in the circuit.

The signal from the vibrating system 1 is applied to the keyed amplifier 2 and then to the rectifying amplifier 3. The transient U2 developed at the output of the amplifier 2 is shown in FIG. 2. The amplifier 3 has two outputs which provide the transient waveform after having it rectified and appropriately amplified. The signal from the first of the two outputs is subject to peak detection in the detector 4 while the signal from the other output is averaged by the average value detector 5 whereafter both the detector output voltages are compared in the adder circuit 6. The difference in the voltages or comparison error is amplified by the amplifier 7 and then applied to the voltage-to-frequency converter 8.

The converter 8 generates the pulse waveform U8 (FIG. 2) of a frequency lower or higher depending on the magnitude of the voltage applied to the converter. The pulse waveform 8 is then applied to the pulse circuit 9, and, in consequence, the bistable multivibrator 12 develops at its output the rectangular wave $U_{12}$ which is used to key the amplifier 2 and is also applied to the integrator 15 enabling a continuous frequency measurement. Another output from the multivibrator 12 is used to control exciting circuit 14 which generates appropriate forcing signal $U_{14}$.

During the time period in which a forcing pulse acts on the vibrating system, the amplifier 2 damps heavily; this is the so-called transmitting period. After a certain constant time period as established by the delay circuit 11, the bistable multivibrator 12 alters its state and, simultaneously, the gain of amplifier 2 rapidly increases, this being the so-called receiving period. A deflection meter 16 is connected at the output of the integrator 15. As is evident from the circuit description above, the circuit arrangement has a negative feedback loop whose effect is to maintain the comparison error of the adder 6 close to zero. This means that the output voltages of both detectors 4 and 5 are substantially equal to each other.

The mean value of the average detector 5 output voltage is given by the following formula:

$$U_m = 2/\pi \cdot K_2 \cdot (U \cdot F)/\alpha \qquad (2)$$

where $K_2$ is the overall gain of the amplifiers, with respect to the second output, and $F$ is the rate of forcing pulses.

At the same time, the output voltage of the peak detector 4 is given by the following formula:

$$U_p = K_1 \cdot U \qquad (3)$$

where $K_1$ is the overall gain of the amplifiers with respect to the first output.

Hence:

$$K_1 \cdot U = 2/\pi \cdot K_2 \cdot U \cdot F/\alpha \quad (4)$$

or $$\alpha = 2/\pi \cdot K_2/K_1 \cdot F = 2/\pi \cdot k \cdot F \quad (5)$$

where $K$ is a constant factor. Therefore, the change in gain of any amplifier alters $K_1$ to the same ratio as $K_2$. In addition, a repeated change in the transient waveform level has no effect on the measurement result.

What is claimed is:

1. A test circuit for measuring the attenuation ratio of vibrating systems, said circuit comprising a vibrating system, amplifier means connected to the vibrating system, a detector connected to the output of said amplifier means and responding to average values at said output, a peak detector also connected to the output of the said amplifier means in parallel to the detector of average values, an adder connected to the outputs of said two detectors for comparing the values thereof, a voltage-to-frequency converter connected to said adder, an exciting circuit connected to the input of said amplifier means, and a pulse circuit having an input connected to said converter, and outputs connected to said exciting circuit and to said amplifier means to complete a negative feedback loop to maintain the difference of outputs of said detectors substantially at zero.

2. A test circuit as claimed in claim 1, wherein said pulse circuit comprises a pulse-shaping circuit connected to the output of said voltage-to-frequency converter, a coincidence circuit connected to the output of said pulse shaper circuit, a delay circuit connected to the output of the converter, and a bistable circuit having an input connected to said delay circuit and one output connected to said coincidence circuit.

3. A test circuit as claimed in claim 1 wherein said amplifier means comprises a keyed amplifier connected to said exciting circuit and a rectifying amplifier connected to the keyed amplifier and having two outputs respectively connected to said detectors.

4. A test circuit as claimed in claim 1 comprising an integrator connected to the output of said pulse circuit, and indicator means connected to the integrator.

5. A test circuit as claimed in claim 2 comprising an integrator connected to a second output of said bistable circuit, and indicator means connected to the output of the integrator.

6. A test circuit as claimed in claim 5 wherein said bistable circuit is directly connected to said amplifier means.

* * * * *

UNITED STATES PATENT OFFICE
CERTIFICATE OF CORRECTION

Patent No. 3,689,831　　　　　　　　　　Dated September 5, 1972

Inventor(s) Henryk Gawronski et al.

It is certified that error appears in the above-identified patent and that said Letters Patent are hereby corrected as shown below:

On the cover sheet [72], "Hfnryk" should read -- Henryk --

Signed and sealed this 20th day of March 1973.

(SEAL)
Attest:

EDWARD M. FLETCHER, JR.　　　　　　　ROBERT GOTTSCHALK
Attesting Officer　　　　　　　　　　Commissioner of Patents